US008194570B2

(12) United States Patent
Mohamed et al.

(10) Patent No.: US 8,194,570 B2
(45) Date of Patent: Jun. 5, 2012

(54) CONFIGURATION TOOL FOR MPLS VIRTUAL PRIVATE NETWORK TOPOLOGIES

(75) Inventors: Jamaluddin Nooruddin Mohamed, Fremont, CA (US); Koteswar Rao Mellachervu, Fremont, CA (US); Somarajan C. Ramakrishnan, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 549 days.

(21) Appl. No.: 11/688,948

(22) Filed: Mar. 21, 2007

(65) Prior Publication Data

US 2008/0232379 A1  Sep. 25, 2008

(51) Int. Cl.
  *H04L 12/28* (2006.01)
  *H04L 12/56* (2006.01)
(52) U.S. Cl. .................. 370/254; 370/395.53; 370/401
(58) Field of Classification Search .................. None
  See application file for complete search history.

(56) References Cited

U.S. PATENT DOCUMENTS

| 7,450,598 | B2 * | 11/2008 | Chen et al. ............... 370/409 |
| 7,486,659 | B1 * | 2/2009 | Unbehagen et al. ......... 370/351 |
| 7,774,500 | B1 * | 8/2010 | D'Souza et al. ............ 709/242 |
| 7,848,259 | B2 * | 12/2010 | Gray et al. ................ 370/255 |
| 2002/0184388 | A1 * | 12/2002 | Yaseen et al. ............. 709/242 |
| 2002/0186664 | A1 * | 12/2002 | Gibson et al. ............. 370/254 |
| 2002/0191541 | A1 * | 12/2002 | Buchanan et al. ......... 370/230 |
| 2004/0255028 | A1 * | 12/2004 | Chu et al. ................ 709/227 |
| 2005/0025069 | A1 * | 2/2005 | Aysan ..................... 370/254 |
| 2005/0091482 | A1 * | 4/2005 | Gray et al. ............... 713/151 |
| 2005/0152284 | A1 * | 7/2005 | Kotha et al. .............. 370/254 |
| 2005/0286441 | A1 * | 12/2005 | Huang ..................... 370/254 |
| 2006/0002401 | A1 * | 1/2006 | Mukherjee et al. ......... 370/401 |
| 2006/0182037 | A1 * | 8/2006 | Chen et al. ............... 370/252 |
| 2006/0259963 | A1 * | 11/2006 | Maxwell et al. ............ 726/15 |
| 2007/0097991 | A1 * | 5/2007 | Tatman ................. 370/395.53 |
| 2007/0133577 | A1 * | 6/2007 | Dong ..................... 370/401 |
| 2007/0177596 | A1 * | 8/2007 | Bapat et al. .............. 370/392 |
| 2007/0223486 | A1 * | 9/2007 | Farid et al. .............. 370/395.2 |
| 2007/0226325 | A1 * | 9/2007 | Bawa et al. .............. 709/223 |
| 2007/0226630 | A1 * | 9/2007 | Farid et al. .............. 715/734 |
| 2007/0280241 | A1 * | 12/2007 | Verma .................... 370/392 |

(Continued)

FOREIGN PATENT DOCUMENTS

| EP | 1 587 240 A | 10/2005 |
| WO | WO 02/099571 A | 12/2002 |

OTHER PUBLICATIONS

Rosen, E. and Y. Rekhter, "BGP/MPLS VPNs", Network Working Group Request for Comments No. 2547, Cisco Systems, Inc., Mar. 1999.

(Continued)

*Primary Examiner* — Chirag Shah
*Assistant Examiner* — Suk Jin Kang
(74) *Attorney, Agent, or Firm* — Baker Botts L.L.P.

(57) ABSTRACT

Configuration tool for virtual private network (VPN) topologies. In particular implementations, a method includes accessing a network topology configuration set comprising one or more route target groups (RTGs), wherein each RTG comprises a topology type identifier, one or more site identifiers, one or more role identifiers associated with each of the site identifiers, and one or more route target identifiers; generating one or more route target statements, based on the topology type identifier and role identifiers of one or more RTGs, defining the export or import of network layer reachability information between one or more routing nodes in a virtual private network (VPN) topology; and transmitting the one or more route target statements to one or more routing nodes.

21 Claims, 7 Drawing Sheets

U.S. PATENT DOCUMENTS

2008/0120129 A1* 5/2008 Seubert et al. .................. 705/1
2009/0028068 A1* 1/2009 Chen et al. .................. 370/254

OTHER PUBLICATIONS

PCT/US2008/057564, Notification of Transmittal of the International Search Report and the Written Opinion of the International Searching Authority, or the Declaration, EPO, Nov. 19, 2008.

Semeria C: "RFC 2547bis: BGP/MPLS VPN Fundamentals" Whitepaper Juniper Networks, XX, XX, (Jan. 1, 2001), pp. 1-38, XP002994705 the whole document.

State Intellectual Property Office of the People's Republic of China, "The First Office Action," Application No. 200880008591.X, received Nov. 10, 2011, 7 pages.

* cited by examiner

CONFIGURATION TOOL FOR MPLS VIRTUAL PRIVATE NETWORK TOPOLOGIES

TECHNICAL FIELD

This disclosure relates generally to virtual private networks.

BACKGROUND

A virtual private network (VPN) is a collection of customer sites that communicate with each other over a network infrastructure that is shared by other VPNs. In a VPN, the sites share common routing information. A given site may belong to more than one VPN if it holds routes from separate VPNs. This provides the capability to build intranets and extranets, as well as any other topology. A Multiprotocol Label Switching (MPLS) VPN uses a network infrastructure provided by an Internet Protocol (IP) MPLS/Boarder Gateway Protocol (BGP) based network. MPLS (Multiprotocol Label Switching) is used for forwarding packets over a provider or backbone network, while BGP (Border Gateway Protocol) is used for distributing routes over the network. VPN in a MPLS/VPN architecture can be conceptualized as a community of interest or a closed user group, which is dictated by the routing visibility that the site will have. MPLS VPN technology supports various VPN topologies such as hub and spoke topologies, central service topologies, full-mesh topologies, and hybrid topologies. The most complex of these topologies to implement and also the widely deployed topology is the hub and spoke topology. Hub and spoke topology is used where a customer requires all of its spoke traffic (e.g., spoke-to-hub and spoke-to-spoke) to pass through the hub network.

A route target (RT) functions as a filter to import and export routes into and out of a given virtual routing and forwarding (VRF) table in order to establish the VPN routes. Allocation and management of RTs is typically performed manually, and thus can be time consuming and error-prone, especially as the complexity of a VPN increase (e.g., as the number of sites joining the VPN increase). Furthermore, errors in the import/export of routes in a VRF table may render a VPN dysfunctional and insecure by introducing undesired extra routes.

DESCRIPTION OF EXAMPLE EMBODIMENTS

A. Overview

Particular implementations facilitate the configuration of virtual private networks (VPNs) deployed over provider or core networks. According to one implementation, a VPN configuration module generates VPN configuration information, including route target export and/or import statements, from one or more route target groups (RTGs). RTGs, in some particular implementations, are elements of a model that facilitate the configuration of route target information for one or more routing elements of a core network. In some implementations, such RTG parameters may include a VPN topology type (e.g., mesh, hub-and-spoke, etc.), RTG node identifiers, one or more roles for each RTG node, and one or more route target (RT) identifiers required for each role. For example, an RTG node may be a provider edge node that connects to a customer edge node in a given customer site (e.g., San Jose). A role may be a role or function in the selected network topology, such as a hub node in a hub and spoke topology. As described in more detail below, each role is associated with one or more route targets (RT) import and export statements. In one implementation, a VPN configuration module receives RTG information including RTG parameters for creating a VPN from one or more RTGs.

In one implementation, an RT functions as a filter by controlling the dissemination of BGP information (e.g., network reachability information) to one or more RTG nodes to enforce a desired VPN topology. In other words, BGP is the language of the protocol that routers use to exchange routing information. In one implementation, the VPN configuration module generates and automatically allocates a RT configuration set based on the RTG parameters. This reduces errors during VPN configuration and abstracts away the need for a user to directly configure the RTs. To generate the RT configuration set, the VPN configuration model identifies both a model topology for each RTG and also RTs for the model topology. As described in more detail below, in some implementations, model topologies may be a hub and spoke topology, a central services topology, a full-mesh topology, or a hybrid topology. A hybrid topology is a combination of two or more model topologies (e.g., a combination of a hub and spoke topology and a full-mesh topology). The VPN configuration model then applies configuration rules to generate import and export statements for VRF tables at each RTG node based on the role of the RTG node. In one example, if the role of a given RTG node is a hub node, the RTG node may have two VRF tables where one VRF table imports routes from one or more spoke nodes and the other VRF table exports routes to one or more spoke nodes. If the role is a spoke node, the RTG node may have one VRF table that exports routes to the hub node and imports routes from the hub node. The VPN configuration module then pushes the RT configuration set to one or more RTG nodes to configure or implement the desired VPN topology. Once the VPN is established, member RTG nodes may route IP traffic via their respective established routes, and share information according to their configured route targets.

B. Example Network System Architecture

B.1. Network Topology

Figure 1:
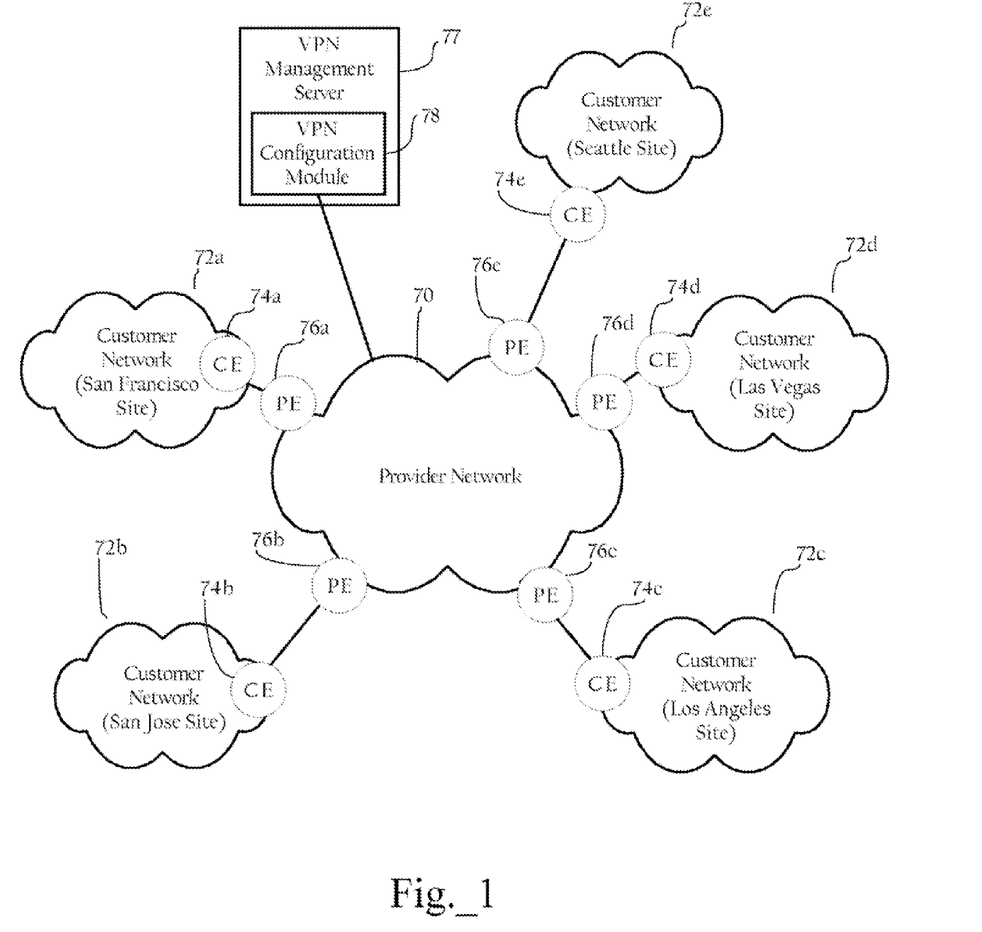
FIG. 1 illustrates an example topology in a MPLS VPN system.

FIG. 1 illustrates an example topology in a MPLS VPN system. In a specific embodiment, the MPLS VPN system includes a provider network 70 interconnecting customer networks 72a, 72b, 72c, 72d, and 72e. for ease of illustration, FIG. 1 illustrates a simple implementation where the provider network 70 provides a VPN for one customer by joining five of the customer sites (e.g., a San Francisco site, a San Jose site, a Los Angeles site, a Las Vegas site, and a Seattle site). As described in more detail below, in other implementations, the provider network 70 may provide VPNs for multiple customers. VPNs may also be configured to create intranets or extranets. In one implementation, the provider network 70 joins customer edge (CE) nodes 74a, 74b, 74c, 74d and 74e via the provide edge (PE) routing nodes 76a, 76b, 76c, 76d, and 76e. As FIG. 1 shows, the PE routing nodes 76a-e reside at the edge of the provider network 70 and function as an interface between the provider network 70 and the customer networks 72a-e. Also, the CE nodes 74a-e reside at the edge of their respective customer networks 72a-e and function as an interface between customer (sub)networks (not shown) and the provider network 70. In one implementation, CE nodes 74a-e are routers.

In one implementation, the MPLS VPN system also includes a VPN management server 77, which is typically installed in a network operations center (NOC) or data center of a MPLS VPN service provider. In one implementation, the management server 77 includes a VPN configuration module 78 that facilitates configuration of the provider network 70 to provide one or more VPNs. The VPN configuration module 78 may reside in a management server or any other appropriate network infrastructure node. In one implementation, the VPN configuration module 78 may be a stand-alone module residing on a server or network operation center, or part of an intergrated network management solution.

Figure 2:
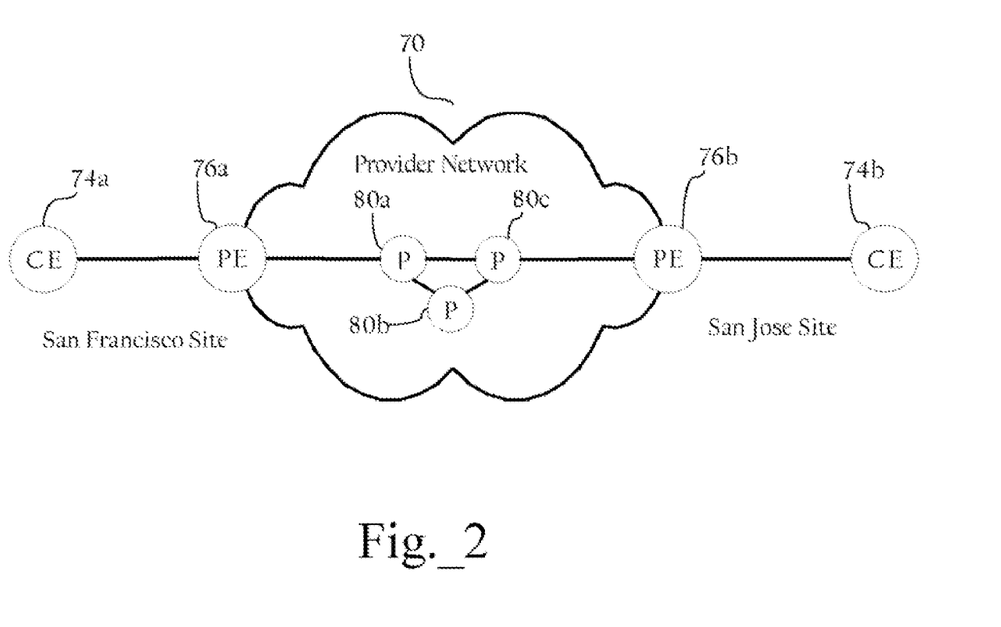
FIG. 2 illustrates a simplified example showing a portion of the MPLS VPN system of FIG. 1, according to one implementation.

The networks 70 and 72a-e, in one implementation, generally refer to packet-based computer networks that may include one or more intermediate network devices (e.g., routers, switches, etc.), which allow for the transmission of messages. FIG. 2 illustrates a simplified example showing a portion of the MPLS VPN system of FIG. 1, according to one implementation. In one implementation, the provider network 70 includes PE routing node 76a operably connected to CE node 74a at a San Francisco site, and PE routing node 76b operably connected to CE node 74b at a San Jose site. For didactic purposes, FIG. 1 also shows provider core routing nodes 80a, 80b, and 80c. Of course, networks 70 an 72 may include a variety of network segments, transmission technologies an components, such as terrestrial wired links, satellite links, optical fiber links, and cellular links. FIG. 1 illustrates one possible network environment in which the invention may operate; however, other implementations are possible.

As discussed in more detail below, the present invention can be configured to provide route target information to the edge routing nodes to implement a desired VPN topology. Provider edge routing nodes 74a-e may comprise edge router platforms that include Virtual Routing and Forwarding (VRF) functionality, operative to host one to a plurality of separate router instances and/or routing table instances. In one implementation, one or more VRF tables may function as one of many virtual routers within a given physical router. In other words, the PE routing nodes maintain one or more "per-site forwarding tables" or "VRF tables." Every site to which a PE router is attached is associated with one of these VRF tables. A particular packet's IP destination address is looked up in a particular per-site forwarding table only if that packet has arrived directly from a site which is associated with that table.

These virtual routers co-exist and operate simultaneously within the same physical router, and one or more virtual routers across multiple routing platforms may be allocated to the VPN of a given customer. This increases the functionality of each physical router by allowing network paths of different VPNs to be segmented without using multiple devices. In one implementation, the VRF tables ensure that IP traffic remains within the correct VPN. In some particular implementations, because traffic is automatically segregated, VRF also increases network security and may eliminate the need for encryption and authentication. In addition, one VRF instance hosted on a given edge router may correspond to a first customer, while a second VRF instance hosted on the edge router may correspond to a second customer. Still further, multiple VRF instances may be associated with a given site. Accordingly, the present invention may operate in connection with provider edge routers generally or VRF instances specific to a given customer or other entity.

In one implementation, the PE routing nodes 76a and 76b are part of an IP MPLS/BGP based network, where BGP information provides network layer reachability information (NLRI) (e.g., the networks that are reachable through a given routing node). As such, a VRF table at each site stores all of the routes available to the site from the VPNs of which the site is a member.

A VRF includes an IP routing table, a derived forwarding table, a set of interfaces that use the forwarding table, and a set of rules and routing protocols that determine what goes into the forwarding table. In general, a VRF includes the routing information that defines a customer VPN site that is attached to a provider edge (PE) router. The VRF is a collection of routes that should be available to a particular site (or set of sites) connected to a PE router.

In BGP/MPLS IP VPNs, PE routers use Route Target (RT) extended communities to control the distribution of routes into VRFs. Within a given iBGP network, PE routers need only hold routes marked with Route Targets pertaining to VRFs that have local CE attachments. Received Route Target membership information can then be used to restrict advertisement of VPN NLRI to peers that have advertised their respective Route Targets, effectively building a route distribution graph. In other words, VPN NLRI routing information flows in the inverse direction of Route Target membership information. In some implementations, a VPN route is tagged with one or more route targets when it is exported from a VRF (to be offered to other VRFs). In addition, a set of route targets can be associated with a VRF, and all routes tagged with at least one of those route targets are inserted into the VRF. In other words, there is a set of Target VPNs that a PE router attaches to a route received from a given site. And there is a set of Target VPNs that a PE router uses to determine whether a route received from another PE router should be placed in the forwarding table associated with the site. The two sets are distinct, and need not be the same. By configuring the route targets properly, one can construct different kinds of VPNs. For example, suppose it is desired to create a mesh network topology which contains a particular set of sites. This can be done by creating a particular route target value to represent the mesh network. This value is then associated with the per-site forwarding tables for each site in the mesh network and/or with the routes learned from a site in the mesh network. Any route which has this route target attribute is redistributed so that it reaches every PE router attached to one of the sites in the mesh network. Alternatively, suppose one desired to create a "hub and spoke" network topology. This could be done by the use of two Route Target Attribute values, one corresponding to the "Hub" and one corresponding to "Spoke". Then, routes from the spokes could be distributed to the hub, without causing routes from the hub to be distributed to the spokes.

B.2. VPN Management Server

Figure 3:
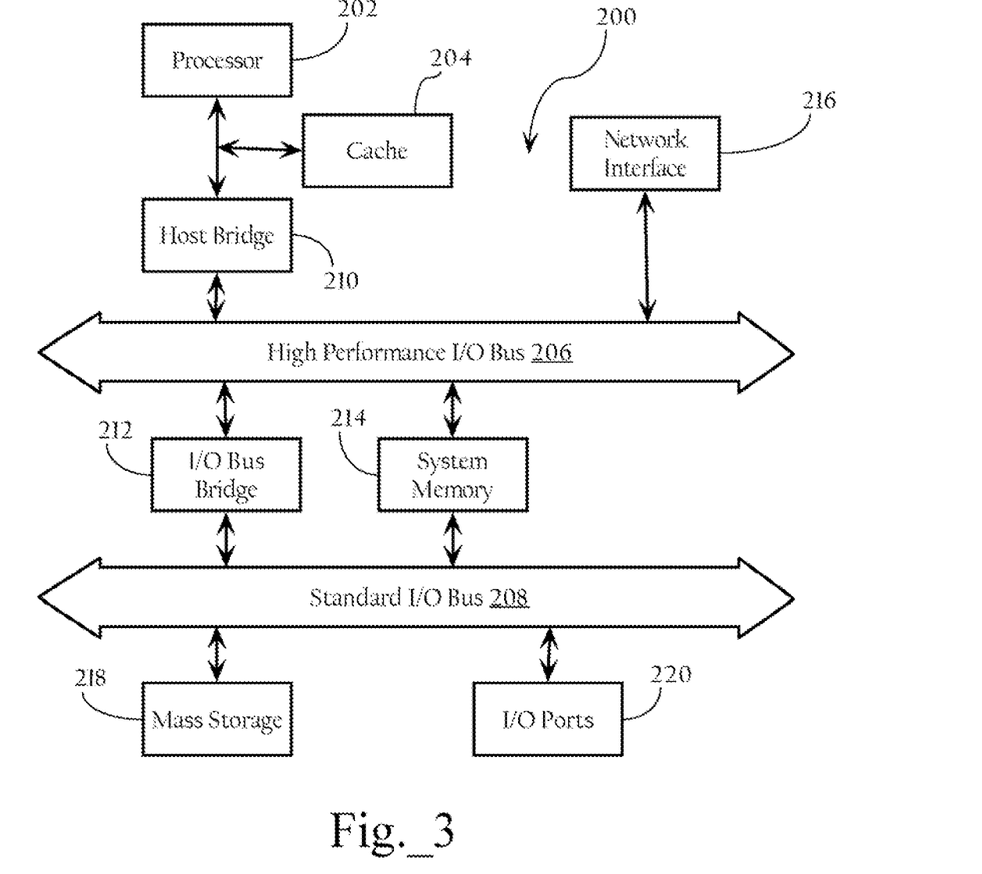
FIG. 3 illustrates an example hardware system, which may be used to implement a VPN management server.

FIG. 3 illustrates an example hardware system 200, which may be used to implement a VPN management server. In one implementation, the VPN configuration functionality described herein is hosted on a network-addressable server or other computing platform. Users access the VPN configuration functionality using a general or special-purpose client application. In other implementations, the VPN configuration functionality can be hosted on a client system. In one implementation, hardware system 200 comprises a processor 202, a cache memory 204, and one or more software applications (including the VPN configuration module 78 shown in FIG. 1) and drivers directed to the functions described herein. Additionally, hardware system 200 includes a high performance input/output (I/O) bus 206 and a standard I/O bus 208. A host bridge 210 couples processor 202 to high performance I/O bus 206, whereas I/O bus bridge 212 couples the two buses 206 and 208 to each other. A system memory 214 and a network/communication interface 216 couple to bus 206. Hardware system 200 may further include video memory (not shown) and a display device coupled to the video memory. Mass storage 218 and I/O ports 220 couple to bus 208. Hardware system 200 may optionally include a keyboard and pointing device (not shown) coupled to bus 208. Collectively, these elements are intended to represent a broad category of computer hardware systems, including but not limited to general purpose computer systems based on the Pentium® processor manufactured by Intel Corporation of Santa Clara, Calif., as well as any other suitable processors.

The elements of hardware system 200 are described in greater detail below. In particular, network interface 216 provides communication between hardware system 200 and any of a wide range of networks, such as an Ethernet (e.g., IEEE 802.3) network, etc. Mass storage 218 provides permanent storage for the data and programming instructions to perform the above described functions implemented in the system controller, whereas system memory 214 (e.g., DRAM) provides temporary storage for the data and programming instructions when executed by the processor 202. I/O ports 220 are one or more serial and/or parallel communication ports that provide communication between additional peripheral devices, which may be coupled to hardware system 200.

Hardware system 200 may include a variety of system architectures; and various components of hardware system 200 may be rearranged. For example, cache 204 may be on-chip with processor 202. Alternatively, cache 204 and processor 202 may be packed together as a "processor module," with processor 202 being referred to as the "processor core." Furthermore, certain implementations of the present invention may not require nor include all of the above components. For example, the peripheral devices shown coupled to standard I/O bus 208 may couple to high performance I/O bus 206. In addition, in some implementations only a single bus may exist, with the components of hardware system 200 being coupled to the single bus. Furthermore, hardware system 200 may include additional components, such as additional processors, storage devices, or memories.

As discussed above, in one embodiment, the operations of the VPN management server 77 described herein are implemented as a series of software routines run by hardware system 200. These software routines comprise a plurality or series of instructions to be executed by a processor in a hardware system, such as processor 202. Initially, the series of instructions are stored on a storage device, such as mass storage 218. However, the series of instructions can be embodied in a carrier wave or stored on any suitable storage medium, such as a diskette, CD-ROM, ROM, EEPROM, et. Furthermore, the series of instructions need not be stored locally, and could be received from a remote storage device, such as a server on a network, via network/communication interface 216. The instructions are copied from the storage device, such as mass storage 218, into memory 214 and then accessed and executed by processor 202.

An operating system manages and controls the operation of hardware system 200, including the input and output of data to and from software applications (not shown). The operating system provides an interface between the software applications being executed on the system and the hardware components of the system. According to one embodiment of the present invention, the operating system is the Windows® 95/98/NT/XP/Vista operating system, available from Microsoft Corporation of Redmond, Wash. However, the present invention may be used with other suitable operating systems, such as the Apple Macintosh Operating System, available from Apple Computer In., of Cupertino, Calf., UNIX operating systems, LINUX operating systems, and the like.

C. VPN Route Target Groups

As described in more detail below, the VPN configuration module 78 utilizes one or more RTGs as building blocks to build a desired VPN topology. In one implementation, an RTG may be defined by certain user requirements such as topology type, one or more RTG nodes (corresponding to PE routing nodes or VRF instances associated with respective sites), one or more RTG roles (e.g., hub node, spoke node, mesh node, etc.) for each RTG node, and a one or more route target identifiers. As described in more detail below in connection with FIGS. 4, 5, and 6, each RTG may be configured with one of multiple VPN topologies; in addition, multiple configured RTGs may be combined to build more complex topologies.

Figure 4:
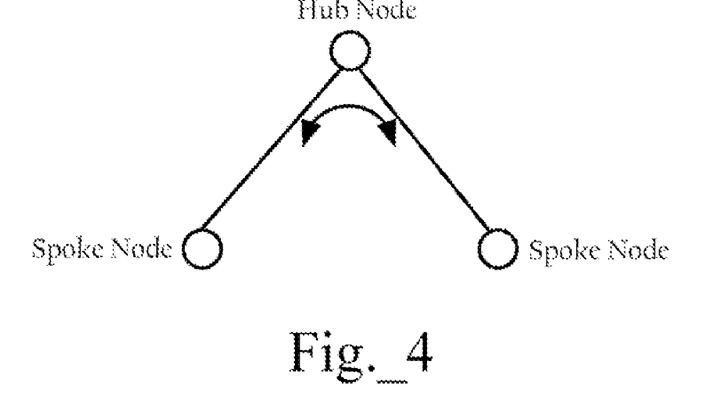
FIG. 4 illustrates an example graphical representation of a hub and spoke route target group (RTG).

FIG. 4 illustrates an example graphical representation of a hub and spoke RTG. The arrows of FIG. 4 (and FIGS. 5 and 6 below) show the message flow among sites according to the various topology types. Generally, the hub and spoke topology is the most widely deployed topology among the available topologies. Hub and spoke topology is also the most complex topology to implement (require more complex route target configuration), because all of the spoke traffic (e.g., spoke-to-spoke) passes through the central hub node. In one implementation, the hub node typically enforces policies such as security and access control, and also monitors all spoke traffic. In one implementation, a VPN having a hub and spoke topology typically uses security services (filters) at the central hub site, traffic logging and/or accounting systems, intrusion detection systems, and hub site internet access.

Figure 5:
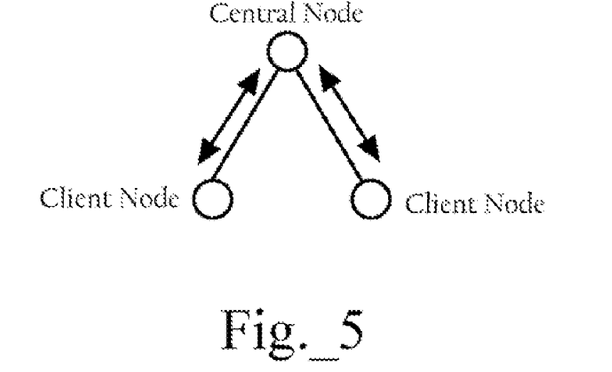
FIG. 5 illustrates an example graphical representation of a central services RTG.
Figure 6:
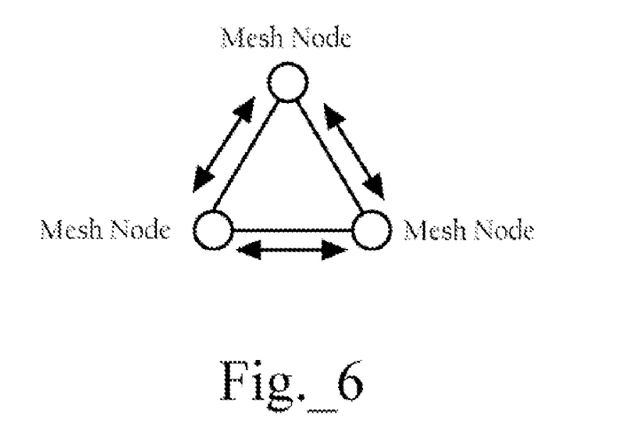
FIG. 6 illustrates an example graphical representation of a full mesh RTG.

FIG. 5 illustrates an example graphical representation of a central services RTG. The central services topology is similar to the hub and spoke topology in that client sites cannot communicate with each other, but may only communicate with one the central site. FIG. 6 illustrates an example graphical representation of a full mesh RTG. As FIG. 6 shows, any one mesh node may send and receive traffic from any other mesh node. As described in more detail below in connection with FIGS. 7 and 8, the RTGs facilitate building and deploying VPNs without the user having to configure RTs directly.

Figure 7:
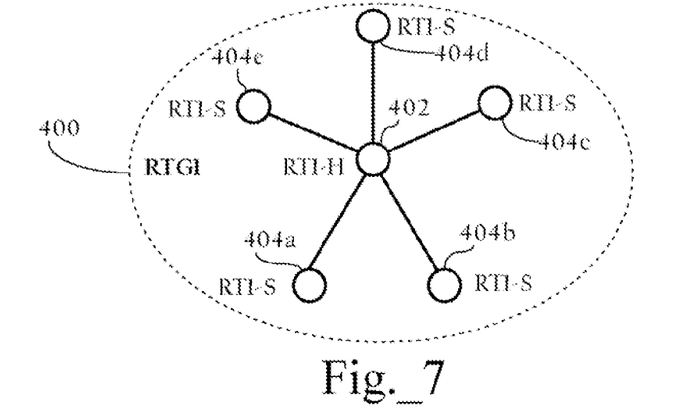
FIG. 7 illustrates an example RTG that can be used to configure a hub and spoke topology.

FIG. 7 illustrates an example RTG 400 that can be used to configure a hub and spoke technology, which the VPN configuration module 78 may use to build a VPN in accordance with one implementation. As FIG. 7 shows, the RTG 400 (e.g., RTG1) includes a node 402 that is assigned the RTG role of a hub node (e.g., RT1-H) for RTG 400. RTG 400 also includes spoke nodes 404a, 404b, 404c, 404d, and 404e that are each assigned the RTG role of a spoke node (e.g., RTG-S)

for RTG 400. In one implementation, if the VPN management module 78 where to add any new nodes to RTG 400, the VPN management module 78 may assign one of the RTG roles (e.g., hub node or spoke node) defined by the RTG. Accordingly, in one implementation, a target VPN topology resembling the topology shown in FIG. 4 would require only one RTG.

Figure 8:
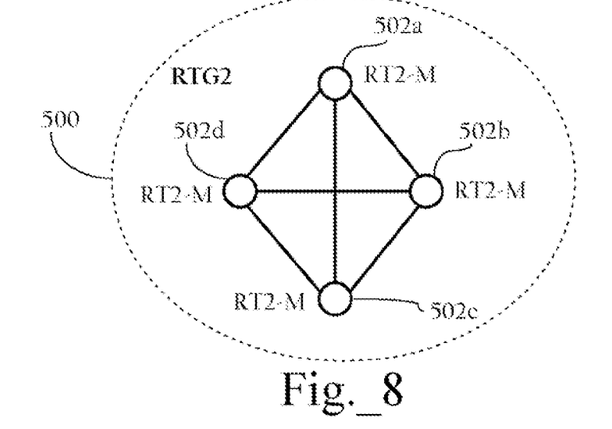
FIG. 8 illustrates an example RTG that can be used to configure a full mesh topology.

FIG. 8 illustrates an example RTG 500 that can be used to configure a full mesh topology, which the VPN configuration module 78 may use to build a VPN in accordance with another implementation. As FIG. 8 shows, the RTG (e.g., RTG2) includes nodes 502a, 502b, 502c, and 502d, each of which is assigned the RTG role of a mesh node (e.g., RT2-M) for RTG 500. Accordingly, in one implementation, a target VPN topology resembling the topology shown in FIG. 5 would require one RTG. In one implementation, if the VPN management module 78 were to add any new nodes to RTG 500, the VPN management module 78 would assign one of the RTG roles (e.g., mesh node) defined by the RTG.

Figure 9:
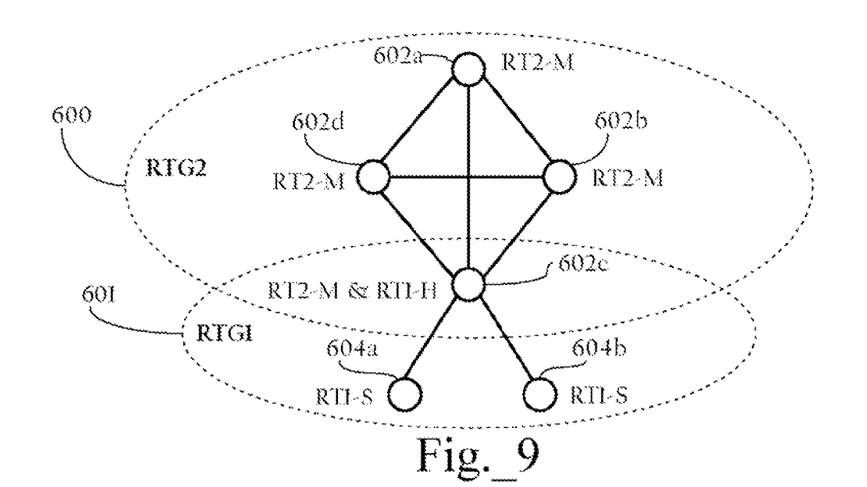
FIG. 9 illustrates an example of multiple RTGs that can be combined to configure a hybrid topology.

FIG. 9 illustrates an example of multiple RTGs that can be combined to configure a VPN having a hybrid topology in accordance with another implementation. As FIG. 6 shows, the hybrid topology includes a combination of RTGs. In one implementation, the VPN configuration module 78 may use existing RTGs that have already been created, as in the following example, or may create new RTGs as needed. In this specific example, this hybrid topology is a combination of RTG1 of FIG. 7 and RTG2 of FIG. 8. RTG 600 includes a set of nodes 602a, 602b, 602c, and 602d that are each assigned the RTG role of a mesh node (e.g., RT2-M) for RTG 600. RTG 601 includes a node 602c that is assigned the RTG role of hub node (e.g., RT1-H) and includes nodes 604a and 604b that are each assigned the RTG role of spoke node (e.g., RTG1-S). In some implementations, a given node may be assigned multiple RTG roles across different RTGs. For example, as FIG. 9 shows, the node 602c is assigned the RTG role of a mesh node (RT2-M) relative to one RTG, and is also assigned the RTG role of a hub node (RT1-H) relative to another RTG.

D. Generation of RT Configurations

Figure 10:
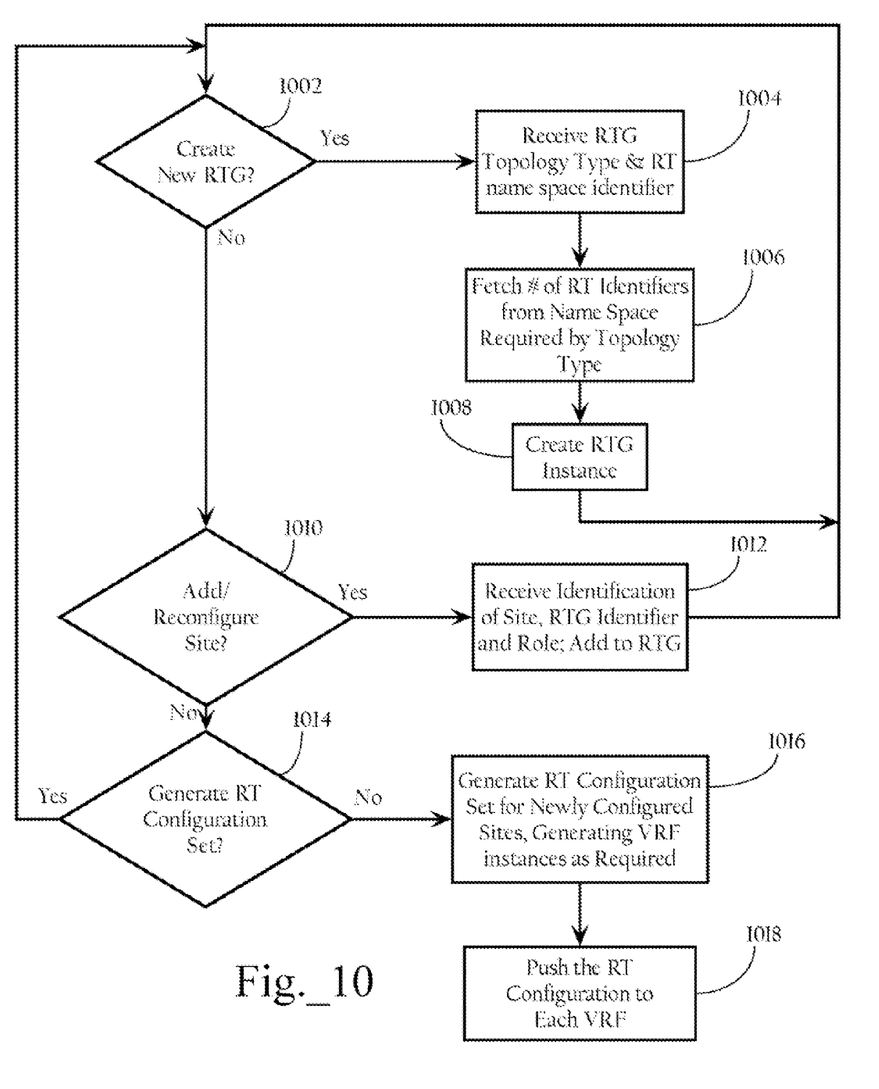
FIG. 10 illustrates an example of method for processing RT configuration information.
Figure 11:
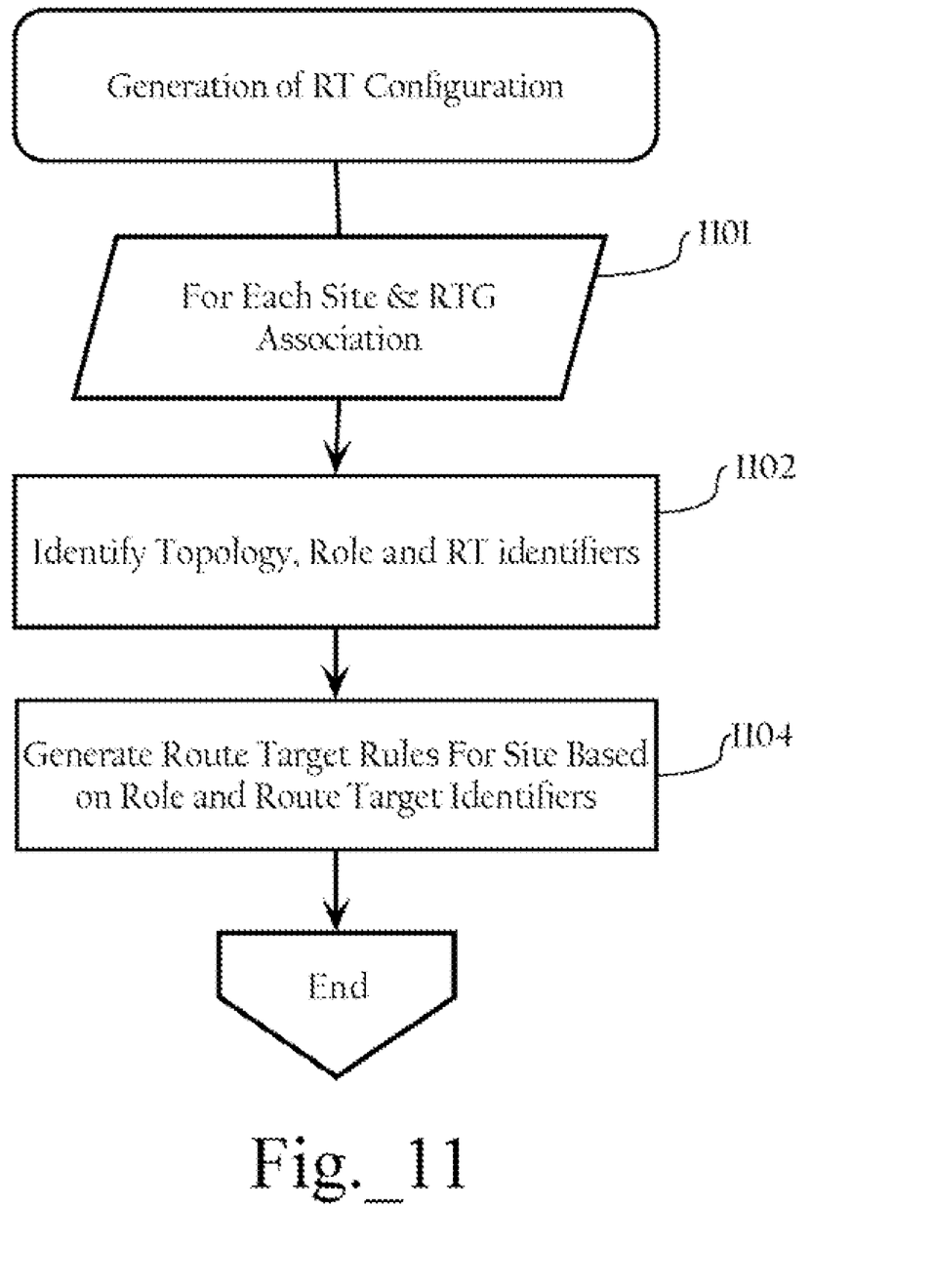
FIG. 11 illustrates an example method for generating an RT configuration set.

FIGS. 7, 8, and 9 graphically illustrate how RTGs may be used to configure a given VPN, the processes shown in connection to FIGS. 10 and 11 show how route target rules (import/export statements) for one or more VRF instances are configured to implement the configured VPN topology. FIG. 10 illustrates an example method for generating RT configuration set information, including route target rules for one or more VRF instances hosted by PE routing nodes of a provider network. As FIG. 10 illustrates, the VPN configuration tool allows users to create new RTG instances, add (or re-configure) sites to existing or newly created RTG instances, and/or generate RT configuration set information.

Generally, the VPN configuration tool operates in a networked computing environment in which it may access one or more sources of network management information characterizing one or more attributes of the core or provider network, such as PE routing node information, VRF information, and customer site information. Other information sources that the VPN configuration tool may consult includes BGP information for the core or provider network, and one or more pools of available route target identifiers and route distinguishing identifiers.

As FIG. 10 illustrates, a user may create a new RTG (1002). In some instances, a new RTG can be created to add a new customer VPN to the network, and/or to add new customer sites to an existing VPN (where addition of the sites to the customer VPN requires a hybrid RTG extension—see, e.g., FIG. 9). For example, to implement the VPN topology of FIG. 9, a user may access the configuration tool and configure two RTG instances (or 1 RTG instance, if an existing RTG instance already exists). For each RTG, the VPN configuration tool receives an RTG topology type, and an identifier for the name space of available route target identifiers (1004). The VPN configuration tool fetches from the identified name space a number of route target identifiers that are required for the selected topology type (1006). For example, for hub-and-spoke topology types, two route target identifiers are required. Other topology types may require fewer or more route target identifiers. As FIG. 10 illustrates, the VPN configuration tool then creates an RTG instance in a database or file (1008). This process may be repeated for any desired number of new RTGs. After an RTG is created, a user may associate one or more sites to the RTG.

In the implementation shown in FIG. 10, the VPN configuration tool allows a user to add or reconfigure a site to a RTG (1010). For example, to add site 604a in FIG. 9, the VPN configuration tool may receive an identification of site 604a, an identification of a RTG, and a role for the site in the RTG (in FIG. 9, hub), and add the site to the identified RTG (1012). Selection or identification of the sites defines the PE routing nodes, and the VRF instances hosted by the PE routing nodes, that are to be configured. Accordingly, the VPN configuration tool, in one implementation, obtains the required information necessary from available network management information to identify the appropriate PE routing nodes and VRF instances.

In some implementations, the VPN configuration tool may provide a set of pull-down menus with restricted choices for sites and RTGs based on a customer identifier. As FIG. 10 illustrates, when the user desires to generate route target configuration sets for the sites and RTGs (1014), the VPN configuration tool generates route target configuration sets for the newly configured sites, generating configuration information for any VRF instances as required (1016). After the route target configuration sets are generated, the VPN configuration tool pushes the route target configurations to the required VRFs of the VPN topology (1018).

FIG. 11 illustrates an example process flow for generating route target configurations. The VPN configuration module 78 applies configuration rules to generate import and export statements for VRF tables at each RTG node based on the RTG role of the RTG node. As FIG. 11 illustrates, when a user desires to create route target configurations for newly created entities, the VPN configuration tool, for each new site and RTG association (1101), identifies the topology type of the RTG, the role of the site and the route target identifiers reserved for the RTG (1102). The VPN configuration tool then generates one or more route target rules for the site based on the role and the route target identifiers (1104). As discussed above, route target configurations comprise route target rules or statements for a VRF instance that define how route targets and the routes to which the route targets are attached are imported and exported by that VRF instance. As discussed above, each topology type defines how the route targets are imported and exported across VRFs. In one implementation, the VPN configuration tool includes logic that defines how route targets are imported and exported for each role in each topology type. Accordingly, to generate a route target configuration for a particular site, the VPN configuration tool selects one or more of the route target identifiers reserved for the RTG, and applies the logic associated with the role identified for the site to create one or more rules that define how the route target(s) are imported and exported. In one example, a hub and spoke topology may have the following rues. In one implementation, one rule may be that with a hub and spoke topology, the hub site may be implemented with two VRF tables, where one is for importing routes (e.g., HUB_IN VRF) and one for exporting routes (e.g., SPOKE_OUT VRF). In one implementation, the VRF tables may be half duplex tables. Still further, the rule logic for generating the route target statements for hub-and-spoke topologies may include:

Rule1: Identify the RTs in the RTG: RT1 as RT-h for export at HUB site and RT2 as RT-s for export at spoke site.
Rule2: IF ROLE=Hub site
  Hubin VRF—import RT-s
  Spokeout VRF—export RT-h
IF ROLE=Spoke Site
  Spoke VRF—export RT-s, import RT-h
Applying these rules results in three VRFS; Two VRFs for HUB site and one VRF for SPOKE site as below:
VRF HUBIN (import RT-s);
VRF SPOKEOUT (export RT-h); and
VRF SPOKE (export RT-s, import RT-h).

Similar rules may be defined for other basic topology types. These rules for generating import/export statements in the VRFs may be applied programmatically. For advanced topologies (formed by combining multiple RTGs), the import/export RT statements are generated by using the roles according to which a site joins the RTGs.

In one implementation, each RTG node stores the RT configuration in the appropriate VRF table or other appropriate data store. As a result, the VRF table for each site stores all of the routes available to the site from the VPNs of which the site is a member, thereby creating the target VPN topology. Once the VPN is established, member RTG nodes may exchange route information using BGP and route Internet Protocol (IP) traffic via their respective established routes.

As the foregoing illustrates, using RTGs simplifies the creation of VPNs for customers, especially with the generation import/export RTs in large and complex VPNs. Using RTGs also makes VPN deployment secure (e.g., error free) by eliminating the manual allocation and configuration of RTs in a large service provider network. Thus this solution cuts down on the operating expenses of services providers.

The present invention has been explained with reference to specific embodiments. For example, while embodiments of the present invention have been described as operating in connection with IEEE 802.11 networks, the present invention can be used in connection with any suitable wireless network environment. Other embodiments will be evident to those of ordinary skill in the art. It is therefore not intended that the present invention be limited, except as indicated by the appended claims.

What is claimed is:

1. A method comprising:
providing a network topology configuration interface including one or more interface elements for configuring one or more route target groups;
accessing a hybrid network topology configuration set comprising two or more route target groups (RTGs) configured with the network topology configuration interface, wherein each RTG comprises a topology type identifier, one or more site identifiers, one or more role identifiers associated with each of the site identifiers, and one or more route target identifiers, wherein at least one site identifier contained in a first RTG is also contained in a second RTG of the two or more RTGs, and wherein the first RTG comprises a different topology type identifier than the second RTG;
generating one or more route target statements, based on the topology type identifier and role identifiers of the two or more RTGs, defining the export or import of network layer reachability information between one or more routing nodes in a hybrid virtual private network (VPN) topology; and
transmitting the one or more route target statements to one or more routing nodes of the hybrid VPN topology.

2. The method of claim 1 wherein the one or more role identifiers may each identify a hub node, spoke node, or a mesh node.

3. The method of claim 1 further comprising generating one or more new RTGs to add one or more new sites to an existing virtual private network.

4. The method of claim 1 further comprising associating one or more new sites to an existing RTG to add the one or more new sites to an existing virtual private network.

5. The method of claim 1 further comprising modifying one or more of the RTGs to reconfigure one or more sites in an existing virtual private network.

6. The method of claim 1 further comprising applying the route target statements to one or more virtual forwarding and routing instances in the one or more routing nodes.

7. The method of claim 1 wherein the topology type identifier is one of a mesh topology, a hub-and-spoke topology or a central services topology.

8. The method of claim 1 wherein the one or more routing nodes are virtual route and forwarding (VRF) instances hosted on respective provider edge routers.

9. The method of claim 1 further comprising
receiving an RTG identifier and a topology identifier corresponding to a particular RTG; and
accessing a pool of route target identifiers to reserve a number of the route target identifiers based on the received topology identifier.

10. Software encoded in one or more non-transitory computer-readable storage media and when executed operable to:
provide a network topology configuration interface including one or more interface elements for configuring one or more route target groups;
access a hybrid network topology configuration set comprising two or more route target groups (RTGs) configured with the network topology configuration interface, wherein each RTG comprises a topology type identifier, one or more site identifiers, one or more role identifiers associated with each of the site identifiers, and one or more route target identifiers, wherein at least one site identifier contained in a first RTG is also contained in a second RTG of the two or more RTGsRTGs, and wherein the first RTG comprises a different topology type identifier than the second RTG;
generate one or more route target statements, based on the topology type identifier and role identifiers of the two or more RTGs, defining the export or import of network layer reachability information between one or more routing nodes in a hybrid virtual private network (VPN) topology; and
transmit the one or more route target statements to one or more routing nodes of the hybrid VPN topology.

11. The software of claim 10 wherein the software is further operable to generate one or more new RTGs to add one or more new sites to an existing virtual private network.

12. The software of claim 10 wherein the software is further operable to associate one or more new sites to an existing RTG to add the one or more new sites to an existing virtual private network.

13. The software of claim 10 wherein the software is further operable to modify one or more of the RTGs to reconfigure one or more sites in an existing virtual private network.

14. The software of claim 10 wherein the software is further operable to apply the route target statements to one or more virtual forwarding and routing instances in the one or more routing nodes.

15. The software of claim 10 wherein the topology type identifier is one of a mesh topology, a hub-and-spoke topology or a central services topology.

16. An apparatus comprising:
one or more processors;
a memory;
a network interface; and
a management application, physically stored in the memory, comprising instructions operable to cause the one or more processors and the apparatus to:
provide a network topology configuration interface including one or more interface elements for configuring one or more route target groups;
access a hybrid network topology configuration set comprising two or more route target groups (RTGs) configured with the network topology configuration interface, wherein each RTG comprises a topology type identifier, one or more site identifiers, one or more role identifiers associated with each of the site identifiers, and one or more route target identifiers, wherein at least one site identifier contained in a first RTG is also contained in a second RTG of the two or more RTGs, and wherein the first RTG comprises a different topology type identifier than the second RTG;
generate one or more route target statements, based on the topology type identifier and role identifiers of the two or more RTGs, defining the export or import of network layer reachability information between one or more routing nodes in a hybrid virtual private network (VPN) topology; and
transmit the one or more route target statements to one or more routing nodes of the hybrid VPN topology.

17. The apparatus of claim 16 wherein the management application further comprises instructions operable to cause the one or more processors and the apparatus to generate one or more new RTGs to add one or more new sites to an existing virtual private network.

18. The apparatus of claim 16 wherein the management application further comprises instructions operable to cause the one or more processors and the apparatus to associate one or more new sites to an existing RTG to add the one or more new sites to an existing virtual private network.

19. The apparatus of claim 16 wherein the management application further comprises instructions operable to cause the one or more processors and the apparatus to modify the one or more RTGs to reconfigure one or more sites in an existing virtual private network.

20. The apparatus of claim 16 wherein the management application further comprises instructions operable to cause the one or more processors and the apparatus to apply the route target statements to one or more virtual forwarding and routing instances in the one or more routing nodes.

21. The apparatus of claim 16 wherein the topology type identifier is one of a mesh topology, a hub-and-spoke topology or a central services topology.

\* \* \* \* \*